United States Patent
Meier et al.

(10) Patent No.: US 6,209,279 B1
(45) Date of Patent: Apr. 3, 2001

(54) MULTILAYER, TRACTION ELEMENT IN THE FORM OF A LOOP

(75) Inventors: Urs Meier, Schwerzenbach; Andreas Winistoerfer, Oetwil am See, both of (CH)

(73) Assignee: Eidgenossische Materialprufungs—und Forschungsanstalt Empa, Dubendorf (CH)

( * ) Notice: Subject to any disclaimer, the term of this patent is extended or adjusted under 35 U.S.C. 154(b) by 0 days.

(21) Appl. No.: 08/913,354
(22) PCT Filed: Mar. 1, 1996
(86) PCT No.: PCT/CH96/00069
  § 371 Date: Sep. 15, 1997
  § 102(e) Date: Sep. 15, 1997
(87) PCT Pub. No.: WO96/29483
  PCT Pub. Date: Sep. 26, 1996

(30) Foreign Application Priority Data

Mar. 17, 1995 (CH) ............................................ 769/95

(51) Int. Cl.$^7$ ...................................................... E04C 3/34
(52) U.S. Cl. ................... 52/649.1; 52/223.14; 52/730.2; 52/DIG. 7
(58) Field of Search ................. 52/698, 166, 167.3, 52/223.8, 223.11, 223.12, 638, 790.1, DIG. 11, 740.1, 649.1, 649.3, 720.1, 730.1, 730.2, 167.1, 223.14; 405/259.5

(56) References Cited

U.S. PATENT DOCUMENTS

| | | | |
|---|---|---|---|
| 2,049,352 | * 7/1936 | Camp | 52/166 |
| 3,111,569 | * 11/1963 | Rubenstein | 52/167.1 |
| 3,598,013 | * 8/1971 | Broberg | 52/698 X |
| 3,668,740 | * 6/1972 | Pearson | 24/16 PB |
| 3,843,080 | * 10/1974 | Imai et al. | 52/698 X |
| 3,967,720 | * 7/1976 | Arieh | 198/833 |
| 4,472,331 | 9/1984 | Kida . | |
| 4,961,687 | * 10/1990 | Bost et al. | 416/230 |
| 5,014,474 | * 5/1991 | Fyfe et al. | 52/167.8 |
| 5,215,616 | * 6/1993 | Fillar | 156/173 |
| 5,600,923 | * 2/1997 | Riley | 52/167.3 X |
| 5,730,556 | * 3/1998 | Barley | 405/259.5 |
| 5,768,847 | * 6/1998 | Poliicelli | 52/649.1 |

FOREIGN PATENT DOCUMENTS

| | | |
|---|---|---|
| 3416011 | * 5/1985 | (DE) . |
| 3844746 | 2/1991 | (DE) . |
| 0302613 | 2/1989 | (EP) . |
| 0566539 | 10/1993 | (EP) . |
| 2200965 | 8/1988 | (GB) . |

* cited by examiner

Primary Examiner—Richard Chilcot
(74) Attorney, Agent, or Firm—Breiner & Breiner (57) ABSTRACT

In order to anchor, reinforce, affix or keep together construction or machine parts, construction members, construction works or parts thereof, or at least to apply a force component, the invention involves a looping anchor or retaining element including several supeposed belt layers or plies.

16 Claims, 5 Drawing Sheets

MULTILAYER, TRACTION ELEMENT IN THE FORM OF A LOOP

FIELD OF THE INVENTION

The present invention concerns a multilayer traction element in the form of a loop to anchor, shear-strengthen, affix and/or keep together construction and machine parts, structural parts, structures and the like, and/or to apply at least one tensile force component, comprising a looping anchor or retaining element. Further, the invention relates to a device for anchoring construction parts, in particular wall anchors, rock anchors, anchors used in bridge construction, etc., to a construction or machine part to apply tensile force components, an internal combustion engine connecting rod and a stabilizing element in construction. Also, a method for manufacturing such devices and elements and a method for affixing them.

BACKGROUND OF THE INVENTION

So-called rock anchors, anchors used in tunnel, bridge and street construction or in general in above and below ground construction, are the means best known to impart the required strength to construction works or to brace them, fasten them or keep them in place. However, similar means are also used in mechanical engineering in order to keep parts together, to assemble them, or to apply forces, to apply them or to deviate them.

As a rule, rod-shaped traction elements are used for such purposes which are anchored, i.e., affixed terminally, whether using screw-tightened laminar elements, wedging elements, screw connections, bolts, bonding, etc. As a rule, tensile or compressive forces will act on the assembled anchor element (s).

These rod-shaped anchor elements or round bars or round steels are metallic and thereby evince substantial weight. Again, anchors are used as rule that are terminally affixed, i.e., "anchored" using screw connections or threads or bolts, and such a feature is undesirable foremost in construction because threads may easily be fouled by dust, sand, gravel etc., and, thus, become rapidly useless.

OBJECTS AND BRIEF DESCRIPTION OF THE INVENTION

Accordingly, it is one object of the present invention to create a device allowing simpler, lightweight, corrosion-proof anchoring of construction works and appropriate, furthermore, to affix, hold and keep together machine structural parts being manufactured.

The problem of the invention is solved by a device as claimed.

The invention proposes to replace conventionally used rod-shaped anchors, namely round steels, by long, looping traction elements which will be affixed, i.e., anchored, in the zones of the loop's two terminal arcs.

These looping anchor elements preferably are made of reinforced plastic, for example of so-called composites, thereby allowing substantial reduction in weight and significant corrosion resistance. Obviously such elements also can be made conventionally of steel. These looping anchor elements offer the substantial advantage that the terminal affixation or anchoring can be implemented without using threads, this feature being desirable foremost on construction sites.

Now it has been found that in the presence of very high tensile forces such looping anchor elements will prematurely fail on account of tensile stress concentration in the region of the terminal loop arcs. As regards fiber-reinforced loops, excessive applied forces will result in failure at the terminal traction arc if the cross-section is too little, that is, the terminal loops or loop arcs constitute the critical portion of the looping element. Even though some palliation may be achieved by increasing the thickness, i.e., the cross-section of the loop, and the tension may be somewhat raised commensurately, in percentage terms however the stress which can be applied in the region of the terminal traction loops drops compared with that in the longitudinal loop segments. Accordingly, increasing the cross-section does not implement the desired improvement in tensile strength.

Therefore, another object of the present invention is to create a device with a looping traction element allowing substantial improvement of the tensile strength, in particular, in the region of the terminal loop arcs without entailing an increase in loop cross-section.

The invention proposes in this respect that the looping anchor, i.e., traction element, comprise several superposed unconnected loop layers or plies. These are thin layers or plies in order that the total loop cross-section of the loop belt composed of several layers or plies also can be kept relatively small. It was found both in theory and practice that the tensile strength of the looping element can be substantially increased while keeping the looping belt cross-section constant by resorting to several superimposed layers or plies instead of a single one layer looping belt.

The prosed looping element of the invention is long and comprises at each end a curved and at least approximately semi-circular traction arc which, in the mounted sate, can rest on a support or anchoring means. However, each terminal arc also may, illustratively, comprise two approximately quarter-circle loop segments in the manner elucidated below in relation to the attached Figures. The plurality of the mentioned loop layers or plies can consist of several loops closing on themselves and being of such dimensions that they rest on or against an adjoining loop.

However, the number of loop layers or plies can also consist of a single belt which loops several times on itself and wherein each of the two belt ends is connected to a directly adjacent loop layer. Such a connection can be implemented by fusion, bonding, riveting, etc. However, it can also be advantageous to affix each of the inner and outer loop ends each in its adjoining zone, that is near the loop, "externally" into the material enclosing the loop. Such a feature, illustratively, applies to construction anchors. Again, the inner end can be allowed to remain loose and the outer end can be affixed merely weakly, for instance, using a flexible or elastic bonding agent, to the adjoining layer underneath, where this affixation is either stretched after the looping element has been stressed or it is broken entirely.

In order to achieve effective increase in tensile strength of the looping element on account of using several layers or plies, it is essential, especially in the vicinity of each of the two terminal traction arcs that the superposed layers or plies shall not stick to one another. In an embodiment variation of the invention, an intermediate layer, for instance made of Teflon, can be provided between the individual layers or plies in the region of the terminal loop arcs, which can be semi-circular arcs, in order that in the presence of high tensile forces, the individual layers or plies shall be able to slip even better relative to each other. Obviously, materials other than Teflon also are applicable, provided that they, on one hand, insure absence of adhesion between the layers and, on the other hand, allow the individual layers to slip over and relative to each other in a manner as frictionless as possible. In order to lessen the stress in the affixation or anchoring of the outer belt end especially as regards looping elements of multi-loop belts, it might be advantageous, however, to minimize or vary the mutual slippage of the layers in the terminal traction arcs, for example, by coating the loop layers or by inserting foils of higher coefficients of friction. Conceivably, too, the inter-layer friction can be raised in the radially outer zone of the terminal arcs while reducing the friction, that is increasing slippage, toward the middle, and then providing radially inward foils or inserted layers offering increased friction.

Figure 14:
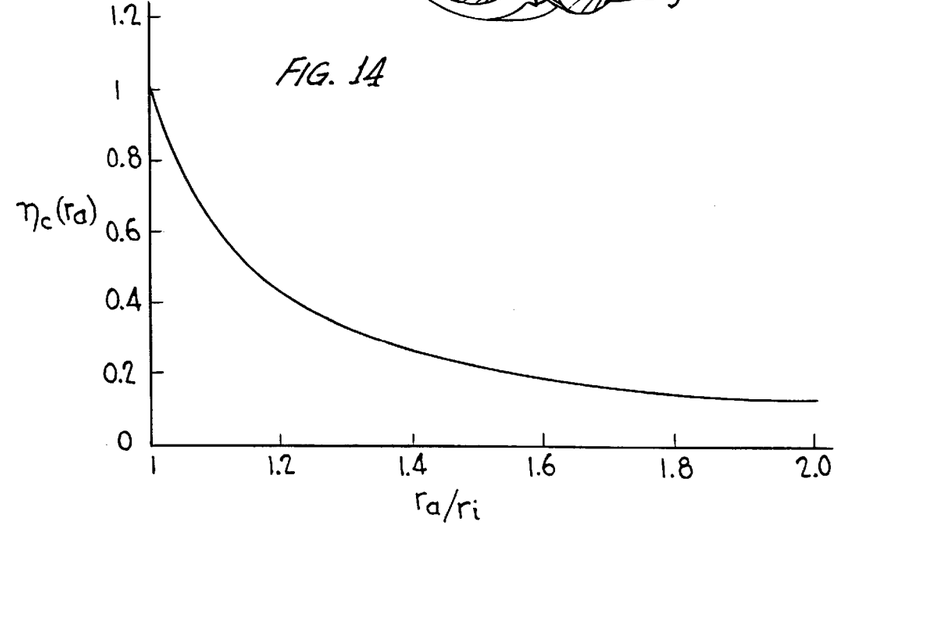
FIG. 14 is plot of the efficiency of force transmission as a function of the thickness of a traction loop, i.e., as a function of the radii ratio.

Experimentation has shown that as the thickness of the traction arcs in the terminal reversing range increases, the tensile strenghth compared to that in the substantially straight segments of these loops will drop relatively strongly. The plot of FIG. 14 shows the effectiveness of force transmission as a function of the thickness of the traction loop, i.e., as function of radius, where $r_a$ is the outer radius of the traction arc in the end zone and $r_i$ is the inner radius of the traction arc in the terminal zone. The plot shown in FIG. 14 makes it plain that already at a radius ratio of about 1.2 the efficiency of force application substantially corresponding to tensile strength is less than 50% compared with the tensile strength in the region of the straight, long traction element. It clearly follows that while keeping the thickness of the traction element substantially constant but also selecting several layers, it is possible to substantially increase the force application, that is the tensile strength of the traction element in its terminal zones.

This relationship can be illustrated by a concrete Example:

(1) System tensile strength for an extruded loop consisting of a single laminate having the following geometry:

laminate thickness: 2 mm
loop width: 10 mm
inside radius $r_1$: 10 mm
Fmax (maximum tensive load): 23.3 kN (2) System tensile strenghth of an extruded loop similar to (1) but consisting of unbound eight layers:

Fmax (maximum tensile strenghth): 46.2 kN.

A more than twice as high maximum tensile strength is obtained thereby, illustrating the advantage of the traction belt of the invention.

The individual layers or plies of the looping anchor or retaining element can be manufactured using a fiber-reinforced plastic, i.e., a so-called composite, in particular a carbon-fiber reinforced composite. Obviously, instead of carbon filters, other reinforcing fibers also can be used. Lastly, the individual layers and plies can be metallic, for example.

The devices of the invention are especially appropriate as anchors used in construction, in road and bridge engineering or in tunnel construction, for example, being in the form of so-called rock anchors. Moreover, the devices of the invention are suitable also to stabilize above-ground buildings such as houses, churches and the like. Further, they are applicable as construction and machine parts to transmit tensile force components and to damp vibrational tensile loads. Illustratively, they can be used in a connecting rod comprising the holding element of the invention in a particular embodiment of a looping retainer. The holding elements of the invention in the form of loops also are appropriate to stabilize constructions such as those exposed to earthquakes or being rebuilt, also in roof construction etc. No limits are set on applicability of the invention which can be appropriately used whenever tensile forces arise. One example is to prevent buckling in machinery frames, for example a heddle frame, or to increase the strength and rigidity of aircraft floors.

The invention furthermore proposes a method for manufacturing looping anchor or retaining elements which is especially well suited to making the device of the invention. In this method, a thin and long belt is looped several times around two mutually spaced support means and the two ends of the belt each are connected to the particular belt layer or ply touched by the particular end by fusion, bonding, riveting, etc. However, the ends of the long belt also can be kept loose or be connected by a flexible or elastic adhesive to the end-touching layer. To assure looping the belt around the two terminal retaining means, the belt must evince adequate flexibility or elastically in order that premature failure in the zone of the terminal traction arcs be precluded. This goal can be achieved either in making the belt very thin by using a material evincing comparatively high flexibility for thin walls, for example using a sheet metal belt, or else, the belt material can be a thermoplastic or non-cured pressure-setting matrix material which can be partly cross-linked or slightly rigified following manufacture and tightening of the looping anchor or tightening element for example by post-annealing. Illustratively, a longitudinally stretched belt can be made using a fiber-reinforced thermoplast or pressure-sensitive plastic, where the latter retains its thermoplastic properties and is correspondingly fluid and evinces some flexibility. This belt is looped around the terminal holding means, the two ends are fused to the abutting layer and thereupon, if so desired, the belt so made is post-annealed at higher temperature, and, if a pressure-setting plastic is used, some rigidity of the looping anchor or retaining element can be achieved, if required, by cross-linking within the belt matrix.

To assure that the individual layers can slip relative to each other, especially in the zone of the terminal traction arcs, advantageously an intermediate layer, for example made of teflon, is mounted either in the zone of the terminal traction arcs between the individual layers, or else the material is coated prior to the construction of the looping element with a material on one hand precluding adhesion between the two layers and on the other hand evincing good sliding properties.

Obviously, the above mentioned method for manufacturing a looping anchor or retaining element is merely illustrative and can be modified in arbitrary manner. In particular, another manufacturing method shall be used in case the anchor or retaining element of the invention is to consist of several superposed loops closing on themselves. In such a case, care must be paid to dimention the indiviudal layers in such a manner that the innermost belt shall be shorter than the outer one. Moreover, the individual belt loops shall be superposed at least nearly directly so that in the presence of tensions, the inner belt loop shall not be loaded excessively while the outer loops are not yet stressed at all. This design also allows adhesion-preventing sliding materials between the individual closed loops, especially in the range of the terminal traction arcs.

A looping anchor or retaining element made in such a manner can be used, for example, as a rock anchor by assuring that the traction arc inserted into the drilled hole also can be anchored. This goal can be attained, for example, by inserting the anchor or retaining element into the drilled hole to be imbedded therein with a casting material in the manner of conventional round steel rock anchors. It is also possible to mount spring or wedge elements in the zone of the traction arc to be inserted into the drilled hole, where the spring or wedge elements are easily insertable but extraction from the drilled hole is precluded by appropriate wedging. The configuration in the drilled hole, in particular of anchors and retaining elements, is elucidated below in relation to the attached Figures.

BRIEF DESCRIPTION OF DRAWINGS

The invention is discussed comprehensively below with reference to the attached Figures.

DETAILED DESCRIPTION OF PRESENTLY PREFERRED EMBODIMENTS

Figure 1:
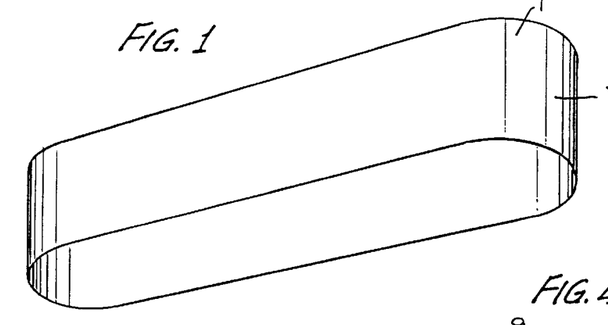
FIG. 1 is a schematic perspective of a looping anchor or traction element.

FIG. 1 is a perspective of a long looping anchor or retaining element 1 of the invention comprising terminal semicircular traction loop ends or arcs 3.

Figures 2, 2A:
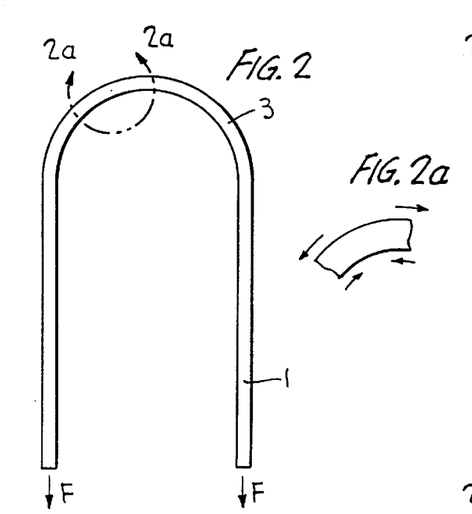
FIGS. 2 and 2a show a cross-section of the terminal arc of a single-layer traction loop.
Figures 3, 3A, 5:
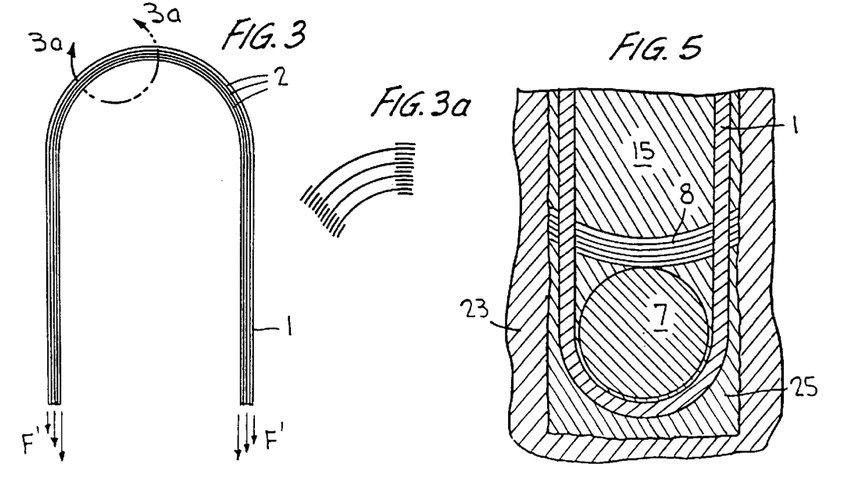
FIGS. 3 and 3a show a cross-section of the terminal arc of a multi-layer loop of the invention.
FIG. 5 is a cross-section of the end of a rock anchor drilled hole corresponding to FIG. 4 comprising means to affix the looping element in the terminal zone of the drilled hole.

The basic concept of the invention is shown in FIGS. 2 and 3 by one terminal section of each of the traction arcs of the retained element. FIG. 2 shows a terminal arc 3 of the retainer element 1 comprising only a single layer as indicated on an enlarged scale in FIG. 2a. On the other hand, FIG. 3 shows a multi-layer retainer element 1 comprising several layers or plies 2 as shown again clearly enlarged in FIG. 3 a. Moreover, the two enlarged FIGS. 2 a and 3a contain arrows indicating the tensile or compressive forces arising in the individual layers or plies, it being quite clear that on account of the comparatively larger layer thickness of FIG. 2a the presence of tensile forces will be much more likely to result in failure of the traction loop than when using several layers or plies as shown in FIG. 3a.

Figure 4:
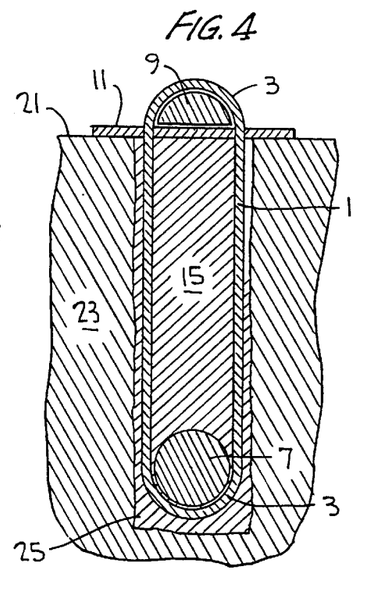
FIG. 4 is a longitudinal section of a rock anchor comprising a looping anchor corresponding to FIG. 1.

FIG. 4 shows such a looping anchor or retaining element 1 being used as a rock anchor which is shown in longitudinal section in the mounted condition. The anchor 1 is mounted into a drilled hole 25 in a base 23. The terminal traction arc 3 of the anchor 1 present in the drilled hole 25 runs around an illustratively cylindrical or rod-like retainer element 7 which was inserted with the anchor during mounting and which was temporarily anchored itself. The traction arc 3 projecting from the surface 21 of the base is affixed or anchored at the surface by a wedge 9 or a holding plate 11 after the drilled hole 25 was filled, for example with mortar or casting material 15.

As shown by FIG. 4, the looping anchor 1 of the invention operates similarly to a conventional anchor device comprising a round steel anchor. In the latter case, after the round bar has been inserted and casting has taken place, the round bar is anchored or affixed from the outside, for example by mounting a base plate which is fastened by means of a thread over the round bar and is tightened by means of a nut.

While FIG. 4 relates to a so-called rock anchor, nevertheless a looping anchor or retaining element 1, such as shown in FIG. 1, also can be used in other anchoring systems in the conventional manner of above and below ground construction. Such retaining elements or traction loops illustratively can be used to pre-stress concrete cross-sections, in particular for subsequent thrust reinforcement, for example, in construction works serving as supports such as bridges, covering segments and the like. Reference is made in this regard to International Patent Application No. WO 93/20296 describing anchoring of pre-stressing means for purpose of shear reinforcement.

FIG. 5 is a sectional view of one end of a drilled hole 25 similar to the drilled hole of FIG. 4. Again the looping element 1 is terminally held in place by a cylindrical or rod-like traction element 7, a further resilient retaining element 8 gripping the drilled hole 25 being mounted therein in an easily insertable manner while precluding removal of the looping anchor 1.

Figures 6A, 6B, 7A, 7B:
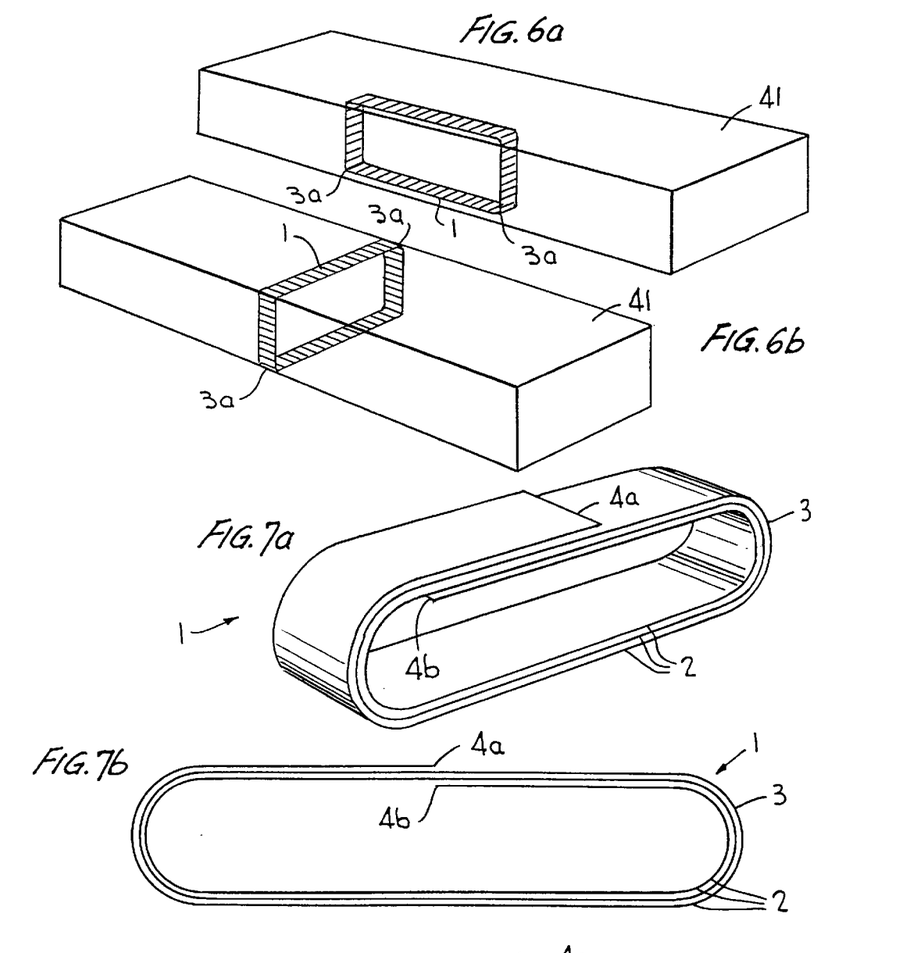
FIGS. 6a and 6b schematically show how to mount a looping thrust-reinforcing element to concrete construction with bearing functions.
FIGS. 7a and 7b are a perspective and a longitudinal section of a looping anchor or traction element comprising several belt layers or plies which are not connected except at the ends.

FIGS. 6a and 6b show another configuration of a mounted looping reinforcing or traction element illustratively in order to subsequently reinforce, with respect to shear, a construction component 41 serving a bearing function. As shown in FIG. 6a, the looping reinforcing element 1 can be mounted longitudinally, or, as shown in FIG. 6b, it may be mounted transversely to the construction component 41. These Figures clearly show that when mounting the looping shear-reinforcing elements 1, no terminal semi-circular loops are being formed, rather two quarter-circle loop segments 3a are formed each time. The questions relating to using one or more loop layers, however, remain the same as when subtending one semi-circular loop end. Again, reference is made to International Patent Application No. WO 93/20296 to relating to a construction component 41 serving a bearing function.

FIGS. 7a and 7b show a looping anchor or retaining element 1 comprising several superposed loop layers or plies 2. FIG. 7a is a perspective of the anchor 1 similar to the representation of FIG. 1, whereas FIG. 7b is a longitudinal section of the anchor 1. The individual belt layers or loops 3 are clearly visible, the individual layers or plies constituting a single long belt. The two ends 4a and 4b of this single long belt each are connected to the layer of the looping element directly underneath or abutting it, for example by bonding, fusion or resorting to mechanical fasteners such as rivets, screws and the like.

Figure 7C:
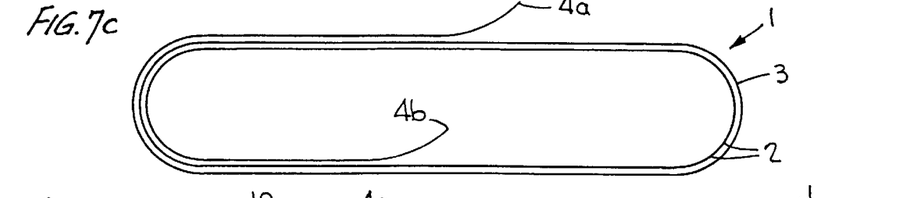
FIG. 7c shows a looping anchor element similar to that of FIGS. 7a and 7b but having loose ends.

FIG. 7c shows a similar looping anchor or retaining element 1 comprising a single long belt wherein however the two ends 4a and 4b are loose. It has been fund in practice, and especially when using the looping anchor in construction that preferably and illustratively the outer end shall be anchored in surrounding masonry or rock whereas the inner end can be left loose because "follow-up slippage" is precluded when tightening the anchor.

Figure 7D:
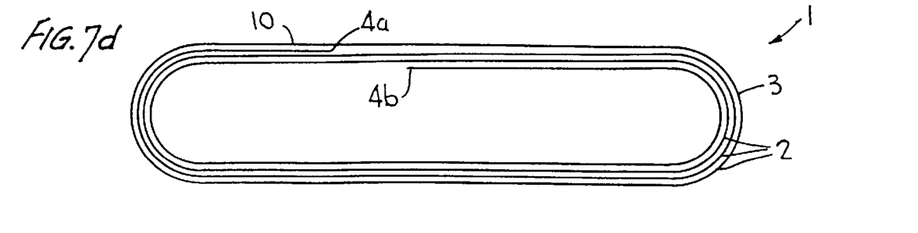
FIG. 7d shows a looping anchor similar to FIGS. 7a and 7b having an external, elastic cladding.

FIG. 7d shows again a looping anchor 1, a sheath 10 provided for the "affixation" of the outer band end 4a, the sheath for example consisting of an elastic material which encloses the remainder of the element in as slack a manner as possible. FIGS. 7c and 7d show variations offering the advantage that, when tightening the anchor 1, the loop layer present above the outer ends 4a will not be excessively stressed in the connection zone to the outer end. It was found in practice that excessive stress on the loop most of the time entails rupture of the outermost loop in the area of the connection to the outer loop end. In order to reduce this stress in the zone of the outer end 4a, it is furthermore possible to affix the outer end 4a, for example, by means of an elastic adhesive to the belt layer underneath.

Figure 8:
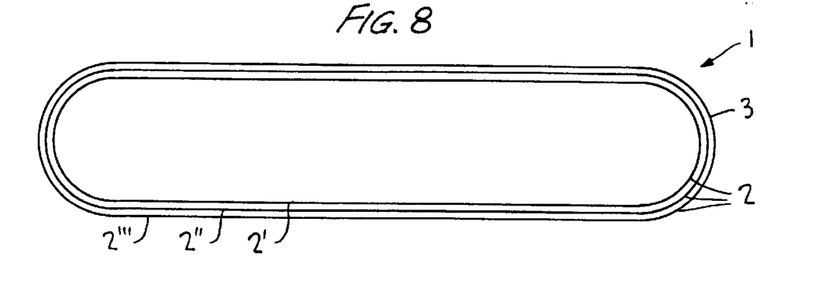
FIG. 8 is a further embodiment variation of a looping element of the invention comprising several belt layer or plies.
Figure 9:
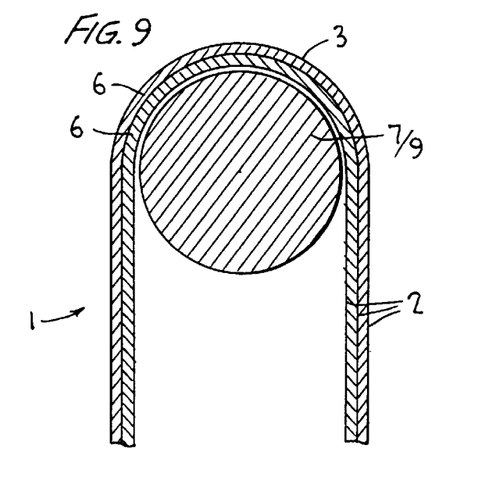
FIG. 9 is a cross-section of a looping anchor or retaining element fitted with sliding material inserted between the individual layers or plies.

It is clearly possible furthermore to form each of the individual loop layers or plies 2 as closed loops as shown in the longitudinal section of FIG. 8. Attention must be paid in the manufacture of the looping anchor of the invention that the individual closed-loop belts are rigorously dimensioned with respect to length to prevent for instance the innermost belt loop being too long or the outermost loop being too short, which, if this were the case, would preclude distributing applied tensile forces over the individual belt layers. Reference is made in this aspect to the following FIGS. 10a, 10b and 11. To fully achieve the advantage of the multilayer design of a looping anchor over a loop of more substantial cross-section, it is essential that tensile forces also can be absorbed as uniformly as possible by the various layers. As already mentioned above, it is mandatory, especially in the region of the terminal traction arcs that the individual layers be able to slide one on the other. This property is made possible for example in the manner shown schematically and in section in FIG. 9 in that a slippery material 6 is mounted between the individual layers 2, this material being either directly mounted between the layers or else the individual belt layers are directly coated. This additional material 6 prevents on the one hand that the individual belt layers stick to each other and on the other hand assures that the individual layers can optimally slide relative to each other.

It was in particular with respect to using a looping anchor consisting of several looped, single, long belts, that it may also be advantageous to implement, not an increase in slipperiness, but an increase in friction between the individual belt layers in the terminal arcs. This increase in friction is applicable especially to the radially outward belt layers because the same are stressed more than the inward ones. Illustratively, this increase in friction can be implemented by inserting foils, such as the so-called very thin separating foils which are about 0.2 mm thick. Conceivably, however, the coefficient of friction can be varied, that is, the foils inserted between the loop layers will evince a higher coefficient of friction, whereas, in particular at the middle of the loop end, the coefficient of friction shall be lower, i.e., that it shall make possible greater slippage between the layers.

Figure 10A:
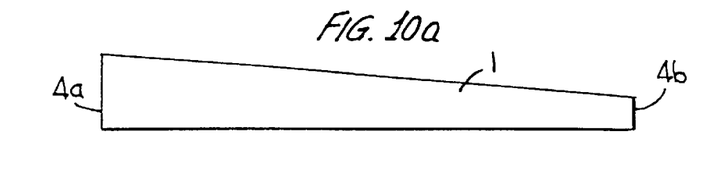
FIGS. 10a and 10b show possible embodiments of the loops or individual layers of the loops of the invention shown in FIGS. 7 and 8 with reference to belt width.
Figure 10B:
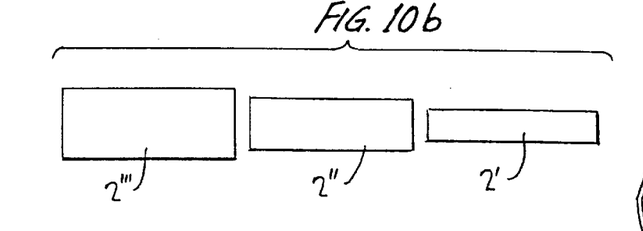

FIGS. 10a and 10b schematically show a preferred case when using a single, multi-looped looping belt as shown in FIGS. 7a and 7b or when using several closed-loop belts as shown in FIG. 8, namely, changing the width of the loop belt from the outer to the innermost loop layer. FIG. 10a shows a nearly "rolled-off" loop belt 1 extending from the outer loop end 4a to the inner loop end 4b. To assure as uniform as possible a distribution of the individual tensile force components on the different loops of the tracing loop 1, the outer loop preferably shall be wider than the inner loop. Stepped decrease in belt width from the outer end 4a to the inner end 4b being problematical, the width shall be preferably decreased continuously from the outer end 4a to the inner end 4b as shown in FIG. 10a.

When using several closed loops 2, 2', 2" and 2'" as shown in FIG. 10, varying the belt width is much simplified, the width of outermost loop 2'" being selectively wide than that of the belt loop 2" and lastly than that of the innermost belt loop 2'.

Figure 11:
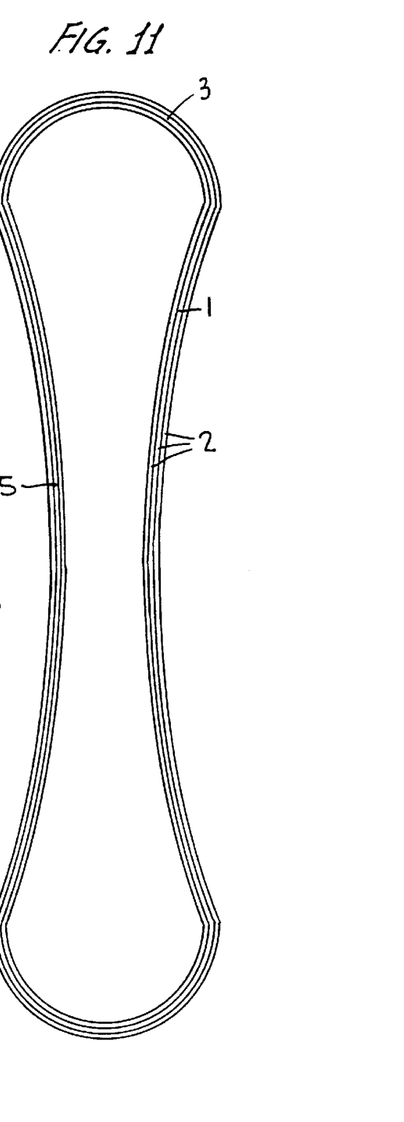
FIG. 11 shows the configuration of a traction loop of the invention similar that shown in FIG. 8.

Another way to achieve as uniform as possible a force distribution in the diverse loop layers is shown in schematic section in FIG. 11, in that the two long legs 5 of the retaining or traction element 1 which connect the two terminal arcs 3 will also be bent. By means of this inward bending shown in FIG. 11, the length differentials relating to the various layers 2 are minimal in the presence of tensile forces. However and again, it is essential that the various layers be configured so as not to be sticking to each other in the traction loop 1 of the invention.

Yet another way to uniformly distribute force is to vary Young's modulus, that is, changing the Young's modulus of example when using several nesting, closed loops from loop to loop. Illustratively, when using a single severally looped looping belt, the Young's modulus can be changed from the inside to the outside for example by changing the proportion of reinforcing fibers, i.e., the modulus material, so that thereby equal force distribution is achieved among the various loop layers.

Figure 12:
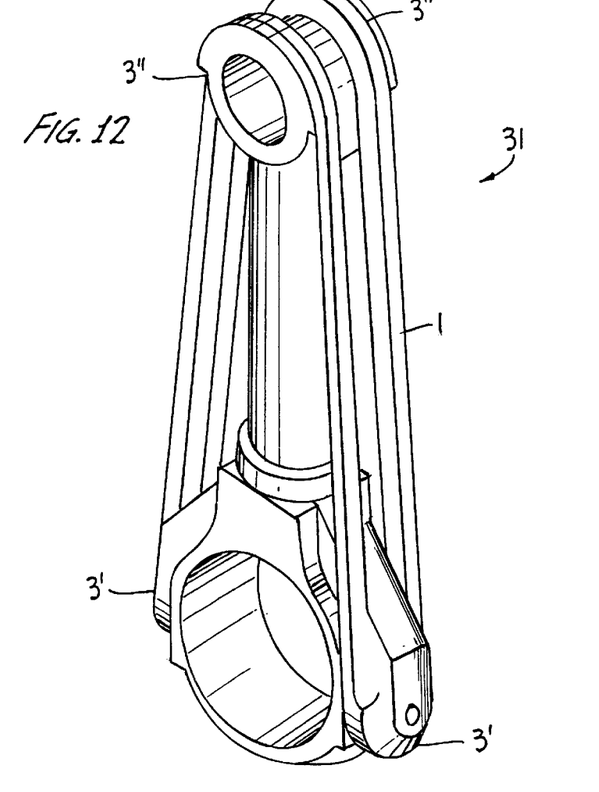
FIG. 12 shows another application of a looping anchor or retaining element of the invention to a connecting rod.
Figure 13:
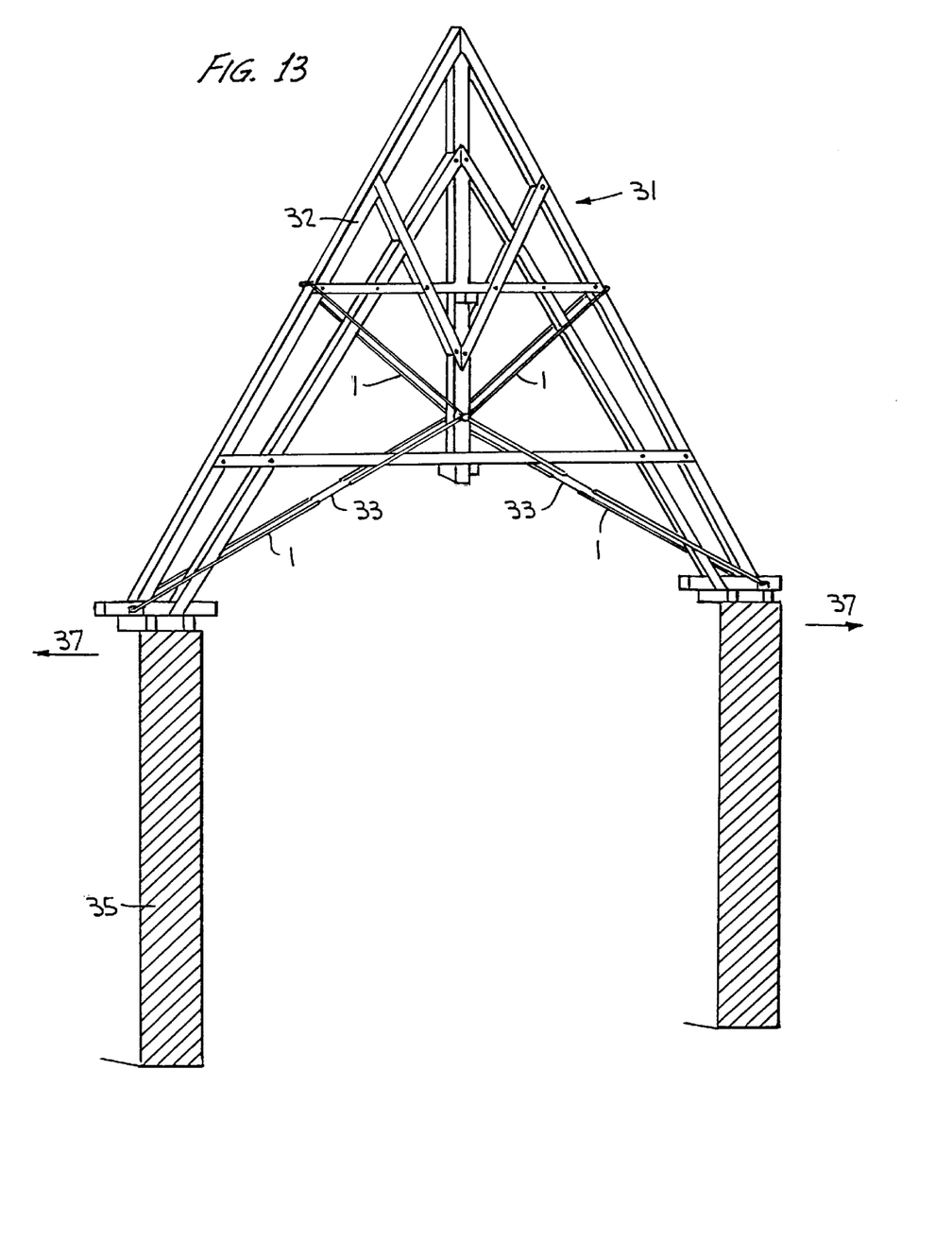
FIG. 13 shows the application of the looping retaining elements of the invention to stabilizing roof construction of a building being rehabilitated.

FIGS. 12 and 13 schematically show two further applications of the retaining elements or traction loops of the invention. These embodiments further elucidate the various uses of the retaining or traction element of the invention.

FIG. 12 schematically shows a connecting rod 31 fitted with a traction element 1 of the invention comprising not only two terminal arcs but two terminal arcs 3' and two middle arcs 3". It was found with respect to construction or machine parts, such as the illustrative connecting rod of FIG. 12, that loops laterally supported at the machine part can support substantially higher loads than can the connecting rod illustratively shown centrally. This feature makes it possible to manufacture machine parts not of cast iron but instead of carbon-fiber reinforced plastics and to compensate the ensuing lower load capacity, for example by means of laterally supported loops. As mentioned above, these looping traction elements also can be made for example of fiber-reinforced plastics, preferably of carbon fibers having a thermoplastic matrix, although other appropriate materials also can be used. Again, as regards machine parts, it can be advantageous to make the looping elements in several layers in order to achieve, especially in the terminal zone of the traction loop or, as shown in FIG. 12, also in the central zone of the loops, of higher tensile strengths. Accordingly, the looping retaining elements of the invention make it possible to achieve enhanced mechanical strength in mechanical engineering, i.e., to transmit and apply forces, and thus make the corresponding machine parts and apparatus more lightweight.

A much different application is shown in FIG. 13, namely, in schematic and simplified manner, the stabilization of construction work, namely a roof. The roof works 31 consists in known manner of mutually joined wood posts, purlins and the like and rests on lateral walls 35, for example the side walls of a building to be rehabilitated such as a church, a large hall, a chateau or the like. As a rule, such walls 35 of buildings requiring rehabilitation no longer are able to withstand the outward forces denoted by arrows 37 generated by the weight of the roof woodwork 31 and therefore are each in danger of collapse. By affixing the traction elements 1 of the invention to the roof 31 as shown in FIG. 13, it is henceforth possible to apply the forces exerted by the roof woodwork on the two walls 35. Central tensioning means 33 may be used to tension the retaining and traction elements 1, as shown in FIG. 13.

Obviously the embodiments illustratively shown in FIGS. 4, 12 and 13 are merely a few applications, and further applications are possible. Illustratively, a heddle frame also may be reinforced using retaining or traction elements of the invention to prevent bending. As a result, it is then possible to make massive machine frames lighter, i.e., to use lightweight materials and reinforcing the machine frame using the retaining and traction means of the invention. Construction works illustratively situated in earthquake-prone areas can be reinforced by means of retaining and traction elements of the invention.

Obviously, too, FIGS. 1 through 13 relate only to examples which can be complemented, modified or changed in arbitrary ways. In particular, the materials suggested for the manufacture of the looping elements refer to specific embodiments which can be appropriately adapted to further applications. In the end the particular requirements will determine whether the reinforcing fibers are carbon fibers, glass fibers, aramide fibers or other reinforcing means and whether to use epoxy resins, polyurethane resins, PEEK, PA, PP, PPS (polyphenylene sulfide) etc., for the particular looping element. However, metal belts also can be used to make a looping element. Again, the terminal anchoring of the looping element can be selected in a most diverse manner.

What is claimed is:

1. A traction element for structural components comprising at least one looping retaining element made of a fiber-reinforced plastic, wherein the looping retaining element comprises a plurality of superposed loops or belt layers wherein the loops or belt layers do not stick to one another and are formed without connection in the terminal arc segments of the loops to thereby allow said plurality of superposed loops or belt layers to slip relative to each other.

2. Traction element as claimed in claim 1 wherein the looping retaining element is long and includes a terminal at least approximately circular arc segment at each end.

3. Traction element as claimed in claim 1 or claim 2 wherein the loops or belt layers each are formed by several individual loops or belts.

4. Traction element as claimed in claim 1 or claim 2, wherein the loops or belt layers are each composed of a single belt severally looped in a superposed manner, with each belt end being connected to or resting loosely against an adjacent loop or belt layer.

5. Traction element as claimed in claim 1 or claim 2 wherein the superposed loops or belt layers have a width which becomes smaller from the outside toward the inside.

6. Traction element as claimed in claim 5 wherein the width of a single loop or belt layer forming the plurality of superposed loops or belt layers becomes smaller from an outer end toward an inner end.

7. Traction element for structural components comprising at least one looping retaining element made of a fiber-reinforced plastic, wherein the looping retaining element comprises a plurality of superposed loops or belt layers and wherein Young's modulus differs from layer to layer.

8. Traction element as claimed in claim 1 wherein the looping retaining element is made of a carbon-fiber reinforced plastic.

9. Traction element as claimed in claim 1 wherein a non-adhesive material having different coefficients of friction is placed between the loops or belt layers at least in a zone in the terminal arc segments.

10. Traction element as claimed in claim 9 wherein the non-adhesive material is teflon.

11. Traction element as claimed in claim 9 wherein the non-adhesive material is foil.

12. Traction element as claimed in claim 1 wherein the looping retaining element is clad by at least one nearly slack flexible outer layer.

13. A method for manufacturing a traction element as claimed in claim 1 wherein a long thin-walled belt having first and second ends is looped into a long, severally superposed configuration, the first and second ends each being connected to a portion of the belt directly adjacent each end.

14. Method as claimed in claim 13 wherein the long thin-walled belt is composed of a fiber-reinforced pressure-sensitive flexible plastic or a fiber-reinforced thermoplastic; the first and second ends are each connected to an adjacent belt portion by fusion, bonding or mechanical means; and, optionally, after tightening is treated with heat, light, infrared or UV irradiation to initiate a cross-linking or rigidification reaction in material forming the belt.

15. Using a traction element as claimed in claim 1 as a wall anchor, rock anchor or bridge construction anchor.

16. Method for mounting a traction element as claimed in claim 1 wherein at least a terminal arc segment of the traction element is inserted into a pre-formed hole and affixed or anchored therein by casting the pre-formed hole shut and anchoring a loop portion projecting from the pre-formed hole.

* * * * *